United States Patent [19]
Zuber et al.

[11] Patent Number: 6,105,325
[45] Date of Patent: Aug. 22, 2000

[54] METHOD, ASSEMBLY AND ADDITIONAL COAT FOR THE CONSTRUCTION OF INTERIOR WORKS

[75] Inventors: Francois Zuber, Vedène; Claude Leclercq, Pernes-les-Fontaines; Pascal Bourne-Chastel, Mormoiron, all of France

[73] Assignee: Lafarge Platres, L'Isle sur la Sorgue, France

[21] Appl. No.: 09/316,013

[22] Filed: May 21, 1999

Related U.S. Application Data

[63] Continuation of application No. 08/793,444, May 9, 1997, abandoned.

[30] Foreign Application Priority Data

Jun. 30, 1995 [FR] France ................................. 95 08153

[51] Int. Cl.⁷ ..................................................... E04B 2/10
[52] U.S. Cl. ........................... 52/416; 52/415; 52/741.41
[58] Field of Search .............................. 52/416, 417, 461, 52/470, 741.41

[56] References Cited

U.S. PATENT DOCUMENTS

| | | | |
|---|---|---|---|
| 3,180,058 | 4/1965 | Tillisch et al. | 52/417 |
| 3,708,935 | 1/1973 | Kossuth et al. | 52/416 |
| 4,205,041 | 5/1980 | Hymes | 264/261 |
| 4,294,622 | 10/1981 | Brown | 524/394 |
| 4,558,079 | 12/1985 | Desmarais | 524/43 |
| 4,845,152 | 7/1989 | Palmer | 524/734 |
| 5,088,260 | 2/1992 | Barton et al. | 52/417 X |
| 5,230,200 | 7/1993 | Douglas et al. | 52/309.9 X |
| 5,334,243 | 8/1994 | Hyman | 106/794 |

FOREIGN PATENT DOCUMENTS

| | | |
|---|---|---|
| 0 496 682 | 7/1992 | European Pat. Off. . |
| 0 521 804 A1 | 1/1993 | European Pat. Off. . |
| 2 505 908 | 3/1982 | France . |

*Primary Examiner*—Richard Chilcot
*Attorney, Agent, or Firm*—Arent Fox Kintner Plotkin & Kahn, PLLC

[57] ABSTRACT

A construction assembly for interior works, comprising:
- (1) plaster boards, each of which plaster boards comprises a plaster body and at least one sheet of lining paper, wherein the lining paper comprises
  - (a) an upper layer or web comprising white cellulose fibers and a mineral filler of light color, and
  - (b) a pigment layer covering said upper layer or web, wherein the pigment layer comprises a mineral filler of light color and a binder, wherein said plaster boards are assembled creating at least one joint; and
- (2) a joint-pointing coat jointing said plaster boards to form a substantially plane outer surface comprising the visible surface of said at least one joint and the visible surface of said pigment layer, wherein the composition of which joint-pointing coat is adapted for the finishing of said at least one joint, wherein said joint-pointing coat comprises a mineral filler of white color;

wherein the composition of said joint-pointing coat is similar to the composition of said upper layer or web and/or said pigment layer, whereby said joint-pointing coat in a dry state and the upper web and/or pigment layer form a substantially homogeneous outer surface having similar coloration, reflectance factors and surface water absorbability, wherein said outer surface is ready to be decorated.

32 Claims, No Drawings

METHOD, ASSEMBLY AND ADDITIONAL COAT FOR THE CONSTRUCTION OF INTERIOR WORKS

This appln is a cont of Ser. No. 08/793,444 filed May 9, 1997, abnd.

FIELD OF THE INVENTION

The present invention relates to the construction of interior works. More particularly, the invention is concerned with any construction method, involving flat prefabricated elements, especially boards, and at least one joint-pointing coat which can be used especially for the finishing of a joint. The flat prefabricated elements comprise a plaster board and at least one sheet of lining paper, at least one outer layer of which has a visible outer face ready to be decorated. The said flat elements are assembled together, especially with a coat, and the joints are finished with the said joint-pointing coat, so as to obtain an overall visible outer surface which is relatively uniform or plane, including in the region of the joints. Such a method is employed, for example, when plasterboards covered with a cardboard lining having a joint-pointing coat are assembled, for the purpose of defining spaces within a building, especially partitions.

DESCRIPTION OF RELATED ART

According to the document EP-A-0,521,804, the lining paper may comprise an upper layer, called an upper web, comprising white cellulose fibres, mainly synthetic, and a mineral filler of light colour, preferably white, and a pigment layer covering the upper layer, comprising a mineral filler of light colour, preferably white, and a binder.

In general the overall visible outer surface obtained according to the above-defined method needs to be prepared, before receiving any surface decoration, such as one or more layers of a film covering of the paint or lacquer type or a wallpaper. This preparation is necessitated especially by the shade or colour differences existing between the visible outer surface of the flat prefabricated elements, for example plasterboards, and the visible outer surface of the joints. After the interior work has been completed, this preparation involves covering the overall surface obtained, i.e. the lining of the flat prefabricated elements plus the joints, with one or more layers of a paint or priming or finishing coat.

The preparation operation represents an appreciable additional cost, for example in a complete process for the construction of a building. And in some cases, it is still insufficient for obtaining an overall decorated surface of uniform appearance, particularly in view of the physico-mechanical differences prevailing between the joints and the flat prefabricated elements.

SUMMARY OF THE INVENTION

The object of the present invention is to overcome the abovementioned disadvantages. More specifically, the object of the invention is a construction method breaking with the traditional approach adopted for solving the problem explained above, that is to say avoiding the need for a preparation of the overall surface, before any decoration. However, the object of the invention is a method which remains compatible with the practices of the professionals in the construction industry, especially those involved in interior works.

According to the present invention, the method differs from the traditional approach in that, the structure and/or composition of the sheet of lining paper and the composition of the joint-pointing coat are coordinated with one another in order, in the dry state of the joint-pointing coat, to obtain an overall surface having one or more physical characteristics, including colour or shade, which are substantially homogeneous in virtually the entire overall surface, including in the region of the visible outer face of the joints.

According to other objects of the invention a construction assembly for interior works is provided, comprising, flat prefabricated elements, especially boards, and, a joint-pointing coat capable of being used especially for the finishing of a joint. The flat prefabricated elements comprise a plaster body and at least one sheet of lining paper, at least one outer layer of which has a visible outer face ready to be decorated. In this assembly, the structure and/or composition of the sheet of lining paper and the composition of the joint-pointing coat are coordinated with one another in order, in the dry state of the joint-pointing coat, to obtain an overall surface having one or more physical characteristics, including colour or shade, which are substantially homogeneous in virtually the entire overall surface, including in the region of the visible outer face of the joints.

A joint-pointing coat, intended to be used in the method or the assembly according to the invention, is also provided.

The present invention affords the following decisive advantages which result from the surface homogeneity of the overall surface obtained according to the present invention, not only in terms of colour or shade, but also in terms of particular physical or physico-chemical characteristics.

Thus, by homogenizing the surface absorption capacity of the lining paper and of the joint-pointing coat, a virtually perfect appearance of the paint layer or paint layers and a virtually uniform adhesion of a wallpaper can be obtained. This subsequently is conducive to the homogeneous detachment of the wallpaper.

DESCRIPTION OF THE PREFERRED EMBODIMENTS

In a preferred version of the invention, there is a sealing coat intended for forming essentially the joints between the various flat elements, with the joint-pointing coat being a finishing coat which can be applied to the sealing coat.

According to an advantageous embodiment of the invention, when there are preexisting flat prefabricated elements, the composition of the joint-pointing coat is coordinated with the structure and/or composition of the sheet of lining paper.

According to another version of the invention, and converse to the foregoing, for a preexisting joint-pointing coat, the composition of the sheet of lining paper is coordinated with the composition of the joint-pointing coat.

Moreover, the method is more preferably characterized in that, in addition to the colour or shade, at least any one of the following physical characteristics is homogenized or matched between flat prefabricated elements and the joint-pointing coat, namely:

the surface appearance, including reflectance;

the absorption of surface water;

decoloration or coloration under the effect of natural light.

Advantageously, these various physical characteristics are defined as follows:

the reflectance factor of the overall surface, including that of the visible outer face of the joints, is between 70% and 80%, and preferably between 72% and 76%, for a wavelength of 457 nm;

the decoloration or coloration of the overall surface, including that of the visible outer face of the joints, has a colour deviation (delta $E^*$) at most equal to 3 after exposure for 72 hours to a source of UV radiation arranged at 15 cm from the surface and having a wavelength at least equal to 290 nm;

the surface water absorption of the overall surface, including that of the visible outer face of the joints, is not less than 60 minutes and/or is at most equal to 15 g/m$^2$ according to the COBB test, at 23° C.

In practice, and by means of routine tests, the average person skilled in the art knows how to coordinate the structure and/or composition of a sheet of lining paper and/or the composition of a coat, so as to satisfy the above-defined technical principles. As a result, the examples described below are in no way limiting.

The present invention will now be described by taking flat prefabricated elements, plasterboards, as an example. These boards are typically composed of a factory-cast plaster body between two sheets of paper forming both its lining and its reinforcement.

Conventionally, one of the sheets of paper used for making the plasterboards has a dark colour which can vary between a grey colour and a chestnut colour, since it is composed of cellulose fibres which have not undergone any particular purifying treatment. Traditionally, this so-called grey paper is obtained from unbleached chemical pulp and/or from mechanical pulp, and/or from thermomechanical pulp and/or from semi-chemical pulp. By mechanical pulp, it is usually meant a pulp obtained entirely by mechanical means from various raw materials, essentially wood, which can be provided by salvaged products originating from wood, such as old cardboard boxes, trimmings of kraft paper and/or old newspapers. Thermomechanical pulp means a pulp obtained by thermal treatment followed by a mechanical treatment of the raw material. By semi-chemical pulp is meant a pulp obtained by eliminating some of the non-cellulose components from the raw material by means of chemical treatment and requiring a subsequent mechanical treatment in order to disperse the fibres.

The other sheet of plasterboards has a visible face, called a lining face, of a colour generally lighter than the grey sheet. To obtain this lighter colour, the layer or layers of this face are based on chemical pulp, if appropriately bleached, composed of recycled and/or new cellulose fibres, and/or on mechanical pulp, if appropriately bleached. By chemical pulp is meant a pulp obtained by eliminating a very large proportion of the non-cellulose components from the raw material by chemical treatment, for example, by cooking in the presence of suitable chemical agents, such as soda or bisulphites. When this chemical treatment is completed by bleaching, a large part of the coloured substances is eliminated, as well as the substances which risk decomposing by ageing and giving unpleasant yellow shades associated with the presence of, for example, lignin.

In a preferred embodiment of the method of the invention, and according to the document EP-A-0 521 804, the content of which is incorporated by reference, the lining paper comprises an upper layer, called an upper web, comprising white cellulose fibres, mainly synthetic, a mineral filler of light colour, preferably white, and a pigment layer covering the upper layer. The pigment layer comprises a mineral filler of light colour, preferably white, and a binder. Correspondingly, according to the present invention, the joint-pointing coat comprises a mineral filler of light colour, preferably white, the grain size of which is between 5 and 35 μm.

The fineness of the grain size of the mineral filler of the joint-pointing coat makes it possible to obtain a smooth surface corresponding to that of the lining of the board. Too large a grain size of the filler gives rise to overall surface defects, such as a reflection of light radiation on the surface of the coat which is different from that on the surface of the board, bringing about differences in tone and brightness of the shade. Too large a grain size also gives rise to differences in physical appearance which are associated with the differences in roughness between the board and the coat.

The mineral filler represents preferably between 50% and 85% of the total weight of the joint-pointing coat.

Moreover, the coat can comprise a hydrophobic agent, for example between 0.2% and 5%, and preferably between 0.5% and 3%, of the total weight of the coat, for example a silicone derivative. This agent slows the drying kinetics of the coat, which is conducive to the non-cracking of the coat. Also, this agent has higher resistance to the attack of steam during operations for the removal of wallpaper, so that the removal can be achieved without thereby impairing the good bonding of a paint or paper adhesive on the overall surface, including the visible surface of the joints. In fact, this hydrophobic agent makes it possible to level off the absorbent capacities of the surfaces of the coat and of the lining paper of the board. Thus, all paints or paper adhesives applied to the overall surface obtained exhibit little shift in absorption kinetics between the coat and the board, thus making it possible to avoid the appearance of spectra or of defects in shade homogeneity.

The coat also comprises an organic binder dispersible in aqueous phase, in a proportion of between 1 and 20%, and preferably between 2 and 12%, of the total weight of the joint-pointing coat, for example polyvinyl acetates and/or acrylic acid esters. The choice of this binder is important, since it must impart sufficient flexibility to the coat to withstand mechanical stresses, and it must have both an adhesive capacity for obtaining a good bond on the overall surface and good resistance to the attacks of UV light.

Moreover, a handling agent is provided in the composition of the coat, especially a water-retaining and thickening agent, for example methylhydroxyethyl-cellulose, in a proportion of 1 to 15%, and preferably of 2 to 12%, of the total weight of the joint-pointing coat.

Finally, at least one slipping agent can be included in the composition of the coat, especially a clay, in the proportion of 0.1 to 2%, and preferably of 0.1 to 0.6%, of the total weight of the joint-pointing coat. These clays are preferably silicate derivatives and more preferably clays of the attapulgite type.

Other components, such as biocides, dispersants, antifoaming agents and pigments can also be incorporated in the composition of the coat in the conventional way.

The invention will be understood better from the following detailed example given as a non-limiting indication.

We proceed from plasterboards similar to Example 5 of document EP-A-0 521 804, which are assembled by means of a conventional sealing joint, for example a joint coat sold under the registered trade mark of "PREGYLYS"® of the Company PLATRES LAFARGE. The upper web of the lining of the board is obtained from 65% bleached synthetic cellulose fibres and 35% talcum and is covered with a pigment layer comprising, as mineral filler, 85% by weight of CaSO$_4$, 2H$_2$O in the form of needles of a length of between 3 and 5 μm and, as a binder, 10.3% by weight of styrene-butadiene copolymer. The sealing joint subsequently receives a thin layer of a joint-pointing coat according to the invention, having the following composition:

50 to 85% by weight of calcium carbonate, grain size from 5 to 35 μm, as a mineral filler;

2 to 12% by weight of a binder comprising polyvinyl acetates and acrylic acid esters in aqueous dispersion;

0.5 to 3% by weight of a silicone derivative as a hydrophobic agent;

0.1 to 0.9% of a cellulose derivative of the methylhydroxyethylcellulose type;

0.1 to 0.6% of a slipping agent of the attapulgite type;

1 to 12% of another silicate derivative as an additional slipping agent;

0.1 to 5% of a polycarboxylic acid ammonium salt as a dispersant;

0.001 to 0.015 of an iron oxide as a pigment;

0.1 to 0.3% of a preparation of N-formoles and isothiazolinones as a biocide;

0.1 to 0.3% of a conventional anti-foaming agent;

water up to 100%.

The weight percentages given are in relation to the total weight of the coat, unless indicated otherwise.

For comparison requirements, standard boards conforming solely to French standard NF P 72-302 and not comprising the above-defined upper web and pigment layer are assembled by means of a joint coat for a plasterboard of the range of coats "PREGYLYS"®, sold by the Company PLATRES LAFARGE.

The characteristics of the two overall surfaces thus formed are compared by applying the following tests:

(A) Degree of whiteness or reflectance factor R obtained according to standard NFQ 03038 with a wavelength of 457 nm. This degree represents the percentage ratio between of a reflected radiation of the body in question and that of a perfect diffuser under the same conditions.

(B) Surface water absorption obtained, for example, according to the COBB test. In this test, a ring defining an area of 100 cm$^2$ is filled with distilled water at 23° C. to a height of approximately 10 mm. The water is left in contact with the overall surface forming the bottom of the ring for one minute, and then the water is emptied and the excess spin-dried. The weight gain of the surface is subsequently determined and brought back to an area of 1 m$^2$. In an alternative version, a drop of distilled water of a volume of approximately 0.05 cm$^3$ at 23° C. is deposited on the surface. It is important that the drop be deposited and not allowed to fall from a variable height which consequently would crush it to a greater or lesser extent, thus falsifying the result. The duration in minutes represents the surface absorption of the tested area.

(C) UV radiation resistance obtained by exposing the overall surfaces, in a cabinet comprising eight high pressure mercury vapour lamps, each of 400 watts, to a wavelength which is not less than 290 nm. The surfaces are maintained at a distance of 15 cm from the lamps and at a temperature of 60° C. for 72 hours. The colour deviations delta E$^*$ are measured on a spectrocolorimeter according to the standard DIN 6174 at an angle of 8°, illuminant D65 as a bright specular, included in the system L$^*$, a$^*$, b$^*$, in which L$^*$ is the luminance, a$^*$ represents the transition from green to red, and b$^*$ represents the transition from blue to yellow. A point E$^*$ in this system, the said point being a function of L$^*$, a$^*$, b$^*$, defines the colorimetry of a sample and the deviation is measured in relation to a reference point. In general terms, a colour deviation beyond 2 becomes discernible to the naked eye.

The results of the tests (A) and (B) are collated in Table I and those of the test (C) are collated in Table II below.

TABLE I

|  | Standard overall surface | Overall surface according to the invention |
|---|---|---|
| Reflectance R (%) | Board: 50 to 60 | Board: 72 to 76 |
|  | Coat: 65 to 85 | Coat: 72 to 76 |
| Absorption | 19 | 13 |
| COBB (g/m$^2$) | Board: 50 | Board: > = 60 |
| Alternative (min) | Coat: 15 | Coat: > = 60 |

This shows that the overall surface according to the present invention is clearly more homogeneous than that of an assembly according to the conventional technique. Moreover, the more homogeneous absorption time of the overall surface makes it possible to use a paint having less covering capacity than that necessary with traditional boards and coats and is also beneficial to the painting operation.

TABLE II

| Before Exposure | Standard | Invention |
|---|---|---|
| Initial measurements of the board | L$^*$ = 82.94<br>a$^*$ = −0.43<br>b$^*$ = 4.64 | L$^*$ = 90.41<br>a$^*$ = −0.03<br>b$^*$ = 3.13 |
| Initial measurements of the joint | L$^*$ = 90.70<br>a$^*$ = 0.73<br>b$^*$ = 5.28<br>Board/Joint colour deviation delta E$^*$ = 7.87 | L$^*$ = 89.70<br>a$^*$ = 0.50<br>b$^*$ = 3.60<br>Board/Joint colour deviation delta E$^*$ = 1 |
| Exposure to UV for 72 hours |  |  |
| Measurements of the board after exposure | L$^*$ = 81.10<br>a$^*$ = 0.69<br>b$^*$ = 12.93<br>Colour deviation delta E$^*$ = 8.56; very substantial yellowing plus chestnut spots | L$^*$ = 90.38<br>a$^*$ = −0.91<br>b$^*$ = 7.40<br>Colour deviation delta E$^*$ = 4.36; substantial yellowing |
| Measurements of the joint after exposure | L$^*$ = 88.90<br>a$^*$ = 0.91<br>b$^*$ = 3.83<br>Colour deviation delta E$^*$ = 2.32; slight yellowing plus a few chestnut spots | L$^*$ = 89.17<br>a$^*$ = 0.50<br>b$^*$ = 3.19<br>Colour deviation delta E$^*$ = 0.67; very slight colour deviation |

This table shows that the colour deviation before exposure to UV is much slighter for an overall surface according to the invention than for an overall surface such as is obtained traditionally.

This table also shows that the change in the colour deviation after exposure to UV is much less pronounced in the overall surface according to the invention than traditionally. In fact, the colour deviation before exposure and after exposure must be as little as possible, so that the overall surface does not give the impression to the naked eye of being spotted or being covered with zones of different shade and brightness.

This is not possible with an overall surface obtained by means of traditional plasterboards and products, but the very slight deviation of the overall surface according to the invention makes it possible to mitigate this disadvantage.

What is claimed is:

1. A construction assembly for interior works, comprising:
   (1) plaster boards, each of which plaster boards comprises a plaster body and at least one sheet of lining paper, wherein the lining paper comprises
      (a) an upper layer or web comprising white cellulose fibers and a mineral filler of light color, and/or
      (b) a pigment layer covering said upper layer or web, wherein the pigment layer comprises a mineral filler of light color and a binder,
   wherein said plaster boards are assembled creating at least one joint; and
   (2) a joint-pointing coat jointing said plaster boards to form a substantially plane outer surface comprising the visible surface of said at least one joint and the visible surface of said lining paper, wherein the composition of which joint-pointing coat is adapted for the finishing of said at least one joint, wherein said joint-pointing coat comprises a mineral filler of white color;
   wherein the composition of said joint-pointing coat is adapted to the composition of said upper layer or web and/or said pigment layer, whereby said joint-pointing coat in a dry state and the upper web and/or pigment layer form a substantially homogeneous outer surface having similar coloration, reflectance factors and surface water absorbability, wherein said outer surface is ready to be decorated.

2. A construction assembly according to claim 1, further comprising a sealing coat preparation disposed at said at least one joint between said plaster boards, the composition of which preparation is adapted for forming essentially said at least one joint between said plaster boards.

3. A construction assembly according to claim 1, wherein the reflectance factors of said joint-pointing coat in a dry state and the upper web and/or pigment layer are between 70% and 80% for a wavelength of 475 nm.

4. A construction assembly according to claim 3, wherein the reflectance factors are between 72% and 76% for a wavelength of 475 nm.

5. A construction assembly according to claim 1, wherein the coloration has a color deviation (delta $E^*$) not exceeding 3 after exposure for 72 hours to a source of UV radiation disposed at 15 cm from the outer surfaces of said joint-pointing coat and the upper layer and/or pigment layer and having a wavelength at least equal to 290 nm.

6. A construction assembly according to claim 1, wherein the surface water absorbability is at least 60 minutes and/or is at most equal to 15 g/m$^2$ according to the COBB test at a temperature of 23° C.

7. A construction assembly according to claim 1, wherein the mineral filler of said joint-pointing coat has a grain size of between 5 and 35 µm.

8. A construction assembly according to claim 7, wherein the mineral filler represents between 50% and 85% of the total weight of said joint-pointing coat.

9. A construction assembly according to claim 7, wherein said joint-pointing coat further comprises a hydrophobic agent, which hydrophobic agent represents between 0.2% and 5% of the total weight of said joint-pointing coat.

10. A construction assembly according to claim 9, wherein said hydrophobic agent represents between 0.5% and 3% of the total weight of said joint-pointing coat.

11. A construction assembly according to claim 7, wherein said joint-pointing coat further comprises an organic binder dispersible in an aqueous phase, which organic binder represents between 1% and 20% of the total weight of said joint-pointing coat.

12. A construction assembly according to claim 11, wherein said organic binder represents between 2% and 12% of the total weight of said joint-pointing coat.

13. A construction assembly according to claim 7, wherein said joint-pointing coat further comprises 1 to 15%, by weight, of a handling agent.

14. A construction assembly according to claim 13, wherein said handling agent represents 2 to 12% of the total weight of said joint-pointing coat.

15. A construction assembly according to claim 13, wherein said handling agent is a water-retaining and thickening agent.

16. A construction assembly according to claim 15, wherein said water-retaining and thickening agent is methylhydroxyethylcellulose.

17. A construction assembly according to claim 7, wherein said joint-pointing coat further comprises 0.1 to 2%, by weight, of at least one slipping agent.

18. A construction assembly according to claim 17, wherein said at least one slipping agent represents 0.1 to 0.6% of the total weight of said joint-pointing coat.

19. A construction assembly according to claim 17, wherein said at least one slipping agent is a clay.

20. A method for the construction of interior works, comprising the following steps:
   (a) assembling, with at least a joint coat, flat prefabricated plasterboards comprising at least
      (1) a plaster body and
      (2) a sheet of lining paper comprising at least
         (i) an upper layer comprising at least white cellulose fibers and/or a mineral filler, and/or
         (ii) a pigment layer comprising at least a mineral filler and a binder;
   (b) finishing joints between adjacent flat prefabricated plasterboards with at least one joint-pointing coat comprising at least a mineral filler and a binder; and thereafter
   (c) drying said joint-pointing coat,
   wherein the composition of said joint-pointing coat is adapted to the composition of the upper layer and/or pigment layer of the lining paper,
   whereby said joint-pointing coat in the dry state and the upper layer and/or pigment layer of the lining paper form a substantially homogeneous outer surface having similar coloration, reflectance factors and surface water absorbability, whereby said outer surface is ready to be decorated.

21. A method according to claim 20, wherein the reflectance factor of the joint-pointing coat is substantially matched with the reflectance factor of the upper layer and/or pigment layer by adjusting the grain size of the mineral filler in the joint-pointing coat.

22. A method according to claim 21, wherein the mineral filler in the joint-pointing coat has a grain size between 5 µm and 35 µm.

23. A method according to claim 20, wherein the surface water absorbability of the joint-pointing coat is substantially matched with the surface water absorbability of the upper layer and/or pigment layer by introducing a hydrophobic agent into the joint-pointing coat.

24. A method according to claim 23, wherein the joint-pointing coat comprises between 0.2% and 5% of said hydrophobic agent.

25. A method according to claim 24, wherein the joint-pointing coat comprises between 0.5% and 3% of said hydrophobic agent.

26. A method according to claim 20, wherein said binder of the joint-pointing coat is organic, wherein the joint-pointing coat comprises between 1% and 20% of said organic binder.

27. A method according to claim 28, wherein the joint-pointing coat comprises between 2% and 12% of said organic binder.

28. A method according to claim 20, wherein the reflectance factors of said joint-pointing coat in the dry state and said upper layer and/or pigment layer are between 70% and 80% for a wavelength of 475 nm.

29. A method according to claim 28, wherein the reflectance factor of said joint-pointing coat in the dry state and said upper layer and/or pigment layer are between 72% and 76% for a wavelength of 475 nm.

30. A method according to claim 20, wherein the surface water absorbability of said joint-pointing coat in the dry state and the upper layer and/or pigment layer of the lining paper is at least 60 minutes and/or at most equal to 15 g/m$^2$ according to the COBB test at 23° C.

31. A method according to claim 20, wherein the coloration has a color deviation (delta $E^*$) at most equal to 3 after exposure for 72 hours to a source of UV radiation arranged at 15 cm from the outer surfaces of said joint-pointing coat in the dry state and the upper layer and/or pigment layer at a wavelength of at least 290 nm.

32. A construction assembly for interior works, comprising
(A) adjacent flat prefabricated plaster boards, each of said plaster boards comprising at least
  (1) a plaster body and
  (2) a sheet of lining paper comprising at least
    (i) an upper layer comprising at least white cellulose fibers and/or a mineral filler, and/or
    (ii) a pigment layer comprising at least a mineral filler and a binder,
(B) at least one joint coat assembling said plaster boards; and
(C) at least one joint-pointing coat jointing said plaster boards to form a substantially plane outer surface, said at least one joint-pointing coat comprising at least a mineral filler and a binder,
  wherein the composition of said joint-pointing coat is adapted to the composition of the upper layer and/or pigment layer of the lining paper so that said joint-pointing coat, in a dry state, and the upper layer and/or pigment layer of the lining paper form a substantially homogeneous outer surface having similar coloration, reflectance factors and surface water absorbability.

* * * * *

UNITED STATES PATENT AND TRADEMARK OFFICE
CERTIFICATE OF CORRECTION

PATENT NO. : 6,105,325

DATED : August 22, 2000

INVENTOR(S) : ZUBER et al.

It is certified that error appears in the above-identified patent and that said Letters Patent is hereby corrected as shown below:

```
    Title page,
        Item, [54], please delete--METHOD, ASSEMBLY AND
ADDITIONAL COAT FOR THE CONSTRUCTION OF INTERIOR WORKS--, and
insert
METHOD, ASSEMBLY AND COMPLEMENTARY PLASTER FOR NON-STRUCTUAL
WORK.
```

Signed and Sealed this

Twenty-fourth Day of April, 2001

Attest:

NICHOLAS P. GODICI

*Attesting Officer*    *Acting Director of the United States Patent and Trademark Office*